United States Patent [19]

Silverthorn

[11] 4,378,063
[45] Mar. 29, 1983

[54] BELT CONVEYOR FOR CONVEYING GRANULAR MATERIAL

[75] Inventor: Charles R. Silverthorn, Eureka, Ill.

[73] Assignee: A. O. Smith Harvestore Products, Inc., Arlington Heights, Ill.

[21] Appl. No.: 249,857

[22] Filed: Apr. 1, 1981

[51] Int. Cl.³ .................... B65G 19/22; B65G 19/28
[52] U.S. Cl. .................................. 198/735; 198/532
[58] Field of Search ................ 198/728, 730–733, 198/735, 532, 546, 563, 860, 861; 193/14

[56] References Cited

U.S. PATENT DOCUMENTS

| | | | |
|---|---|---|---|
| 573,913 | 12/1896 | Patterson et al. | 198/532 X |
| 1,235,406 | 7/1917 | Williams | 198/563 |
| 2,581,725 | 1/1952 | Smallegan | 198/735 X |

FOREIGN PATENT DOCUMENTS 58689  3/1954  France ................ 198/735

OTHER PUBLICATIONS

Feed & Grain Times, Apr. 1978, p. 31, The Essmueller Co.
Flowmaster Conveyor, Hunter Mfg. Inc., Nov. 1977.

*Primary Examiner*—James G. Smith
*Assistant Examiner*—Douglas D. Watts
*Attorney, Agent, or Firm*—Andrus, Sceales, Starke & Sawall

[57] ABSTRACT

An improved belt conveyor for conveying granular materials, such as grain. The conveyor comprises a pair of end sections which are connected together by a plurality of central sections to provide the conveyor with the desired length. An endless conveyor belt, having a plurality of integrally molded cleats, is carried by a pair of drive rollers, each of which is journalled in one of the end sections. The grain, or other granular material, is fed into a hopper at one of the end sections and is conveyed along the bottom surface of the conveyor sections by the cleats and is discharged through openings in the bottom surface to feed bins. The central conveyor sections are tapered throughout their length so that adjacent ends of the sections can be telescoped together to conveniently vary the length of the conveyor and facilitate attachment of the conveyor sections. The openings in the bottom surface of the conveyor sections can be closed off by manually movable closure plates to thereby vary the distribution pattern to various feed bins.

5 Claims, 5 Drawing Figures

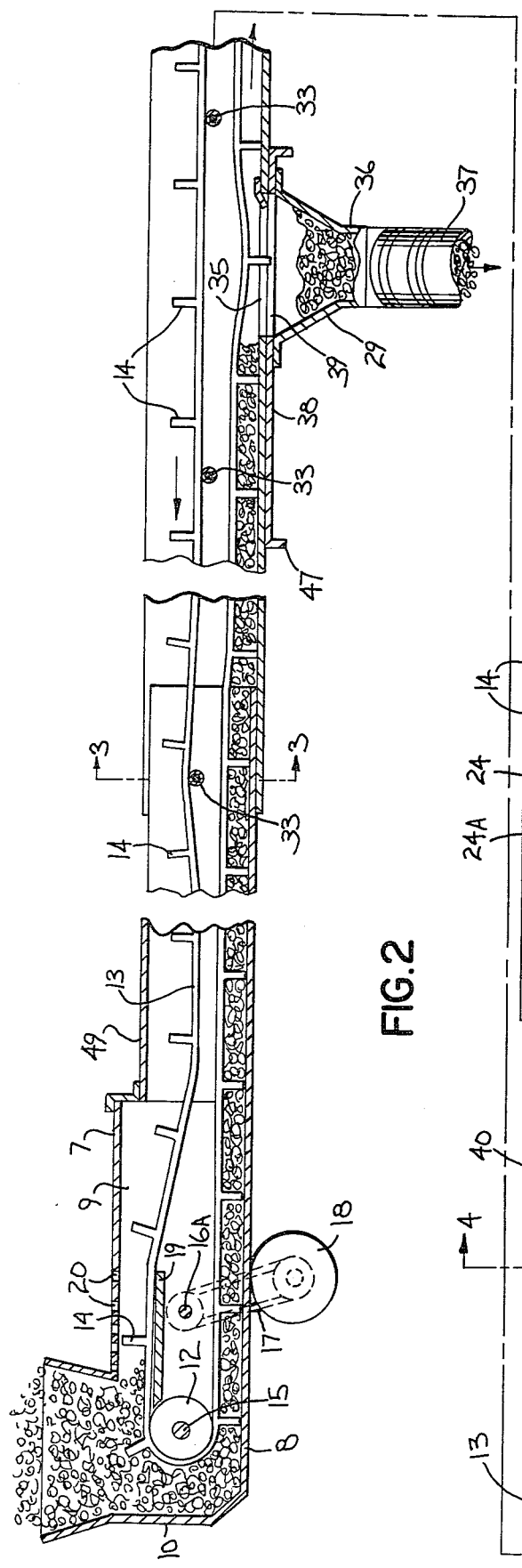
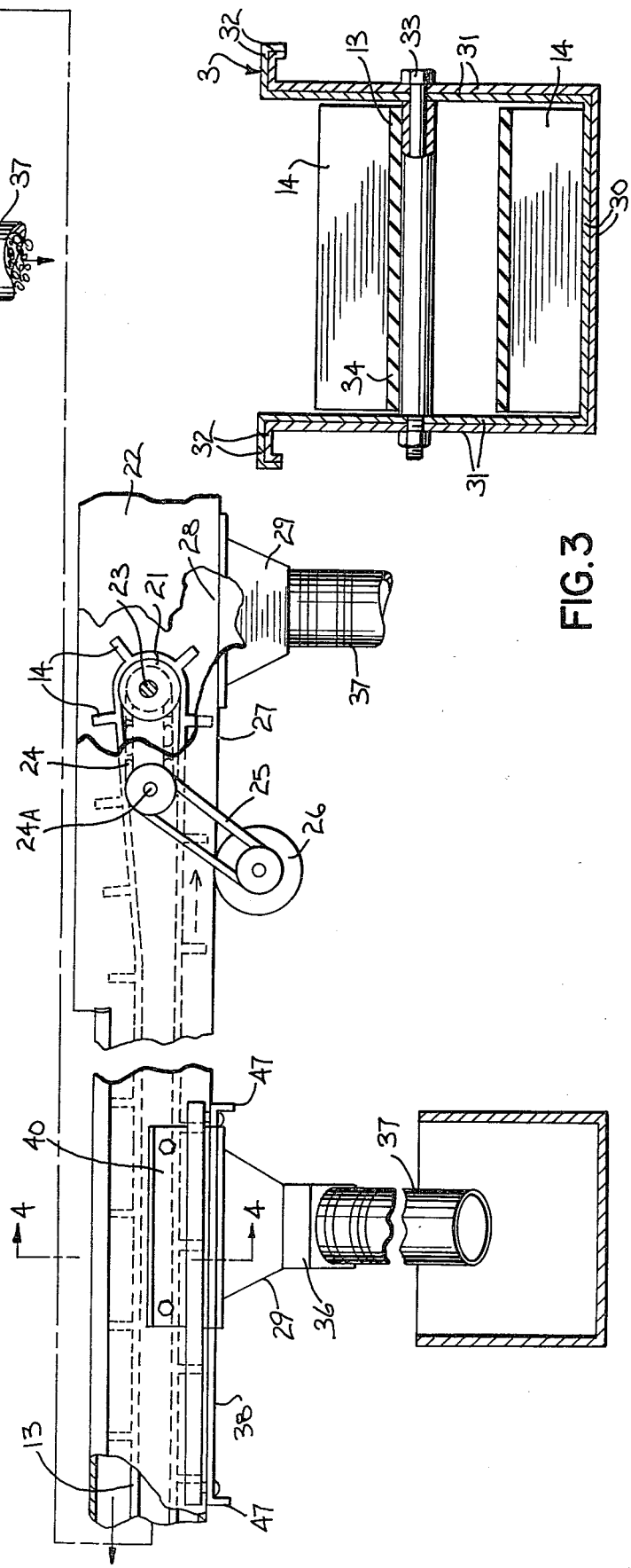
FIG. 2
FIG. 3

BELT CONVEYOR FOR CONVEYING GRANULAR MATERIAL

BACKGROUND OF THE INVENTION

Various types of conveyors are used in livestock feeding systems. The chain drive cleat conveyors and screw or auger type conveyors are very common. While effective conveyors, they are subject to high rates of corrosion, wear, and noise, as well as presenting considerable safety hazards. Endless belt conveyors, while solving many of these problems, have seen limited use in livestock feeding systems due to problems in belt conveyor design relating to insufficient frictional contact between the belt and drive rolls, excessive physical space requirements, and feed build-up under belt surfaces.

SUMMARY OF THE INVENTION

The invention is directed to an improved endless belt conveyor having particular use in a livestock feeding system. The conveyor is normally suspended from the ceiling of the barn or other feed enclosure and serves to convey grain or other granular feed material throughout the length of the barn and distribute the feed into a plurality of feed bins.

The conveyor comprises a pair of end sections which are connected together by one or more central sections. The central sections are constructed in given modules of length and the overall length of the feed system will determine the number of sections to be utilized.

A drive roller is journalled within each end section and an endless conveyor belt, having a plurality of integrally molded cleats, is carried by the drive rollers. To introduce feed to the conveyor, a hopper is associated with one of the end sections. The feed is conveyed along the bottom surface of the conveyor sections by the cleats and is discharged through openings in the bottom surface to feed bins. The openings in the bottom surface of the conveyor sections can be closed off by slidable closure plates so that the feed can be selectively delivered to the various feed bins, as desired.

As a feature of the invention, the central conveyor sections are tapered throughout their length, so that the adjacent ends of the sections can be telescoped together. The telescopic feature provides a convenient manner of connecting the sections together, which eliminates the use of splicer plates. By varying the amount of overlap at the telescoped joints, standard length conveyor sections can be used to obtain any desired overall conveyor length without the necessity of cutting the sections.

As both drive rollers are independently driven, the area of frictional contact between the belt and the drive is increased to thereby correspondingly increase the load capacity of the conveyor.

The belt conveyor provides a smooth and quiet operation, and the feed is conveyed by the cleats without any appreciable agitation, thereby minimizing separation of the components of the feed mix.

Other objects and advantages will appear in the course of the following description.

DESCRIPTION OF THE DRAWINGS

The drawings illustrate the best mode presently contemplated of carrying out the invention.

In the drawings:

FIG. 2 is a schematic longitudinal section of the conveyor with parts broken away;

FIG. 3 is a section taken along line 3—3 of FIG. 2;

FIG. 4 is a section taken along line 4—4 of FIG. 2; and

FIG. 5 is an enlarged vertical section showing a feed outlet and closure plate.

DESCRIPTION OF THE PREFERRED EMBODIMENT

Figure 1:
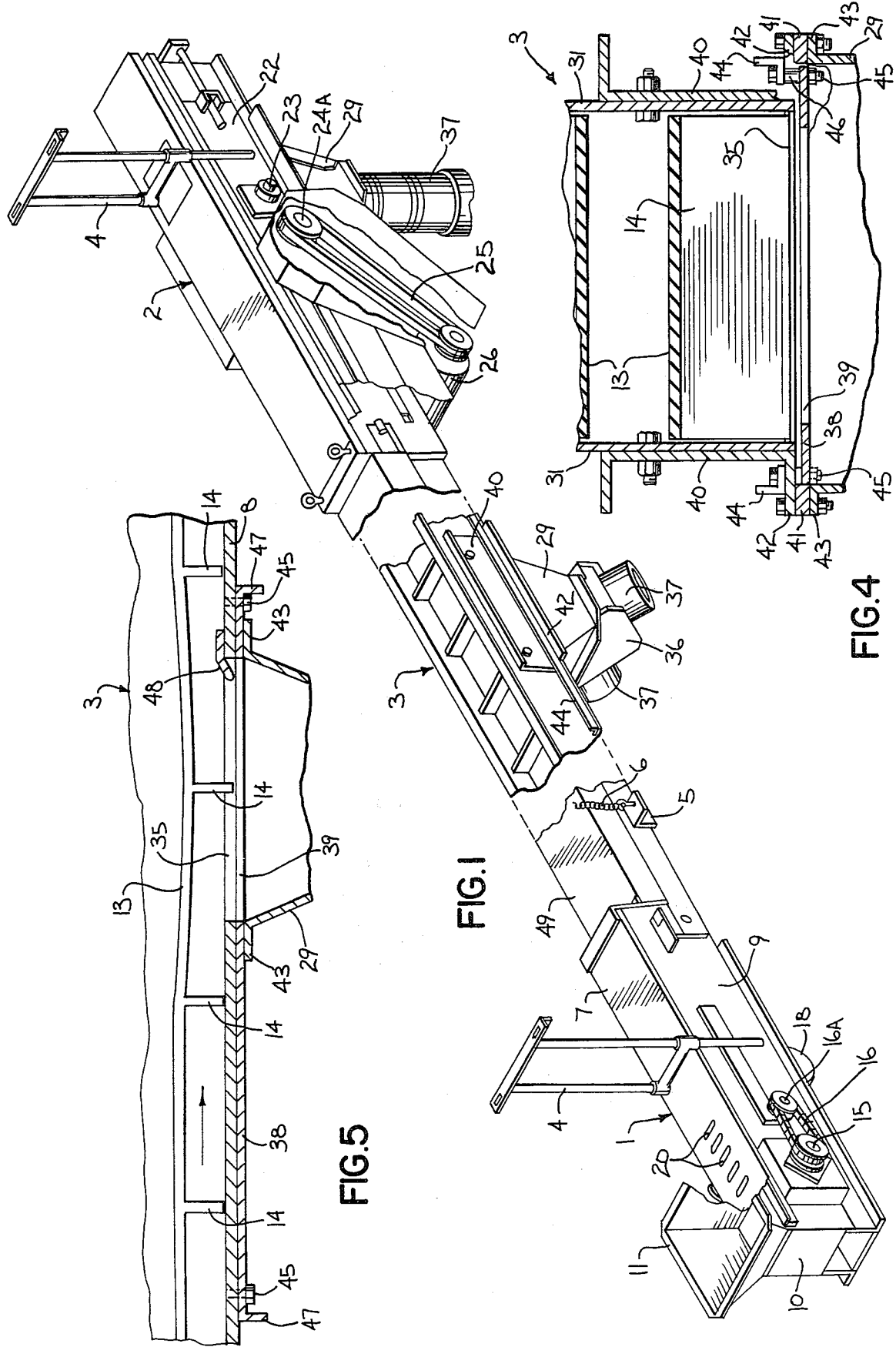
FIG. 1 is a perspective view of the conveyor of the invention.

FIG. 1 shows the conveyor of the invention as installed in a barn, or other feed area. The conveyor is normally suspended from the ceiling joists of the barn or other enclosure and extends over the livestock feeding area. In use, a granular feed mix which can include grain, shelled corn, and other supplements, is fed into one end of the conveyor and is distributed to a plurality of feed bins located in the livestock feed area.

The conveyor is composed of a pair of end sections 1 and 2 which are connected together by a plurality of intermediate or central sections 3. The central sections have have a standard length generally in the range of about 10 ft, and while the drawings illustrate two central sections being utilized, it is contemplated that the conveyor may extend several hundred feet, with the number of central sections 3 being determined by the overall length of the conveyor.

Each end section 1 and 2 is supported from the ceiling joists by a carrier 4, and the central sections 3 are supported in generally U-shaped brackets 5 which are suspended from the ceiling joists through chains 6. The central sections are freely mounted on the brackets 5 so that they can slide with respect to the brackets during assembly or disassembly.

The end section 1 includes a top wall 7, a bottom wall 8, a pair of side walls 9, and an end wall 10. A hopper 11 is mounted in the top wall 7 and the feed material to be conveyed is introduced into the hopper.

Journalled within the side walls 9 is a drive roller 12 which carries an endless conveyor belt 13 having a plurality of integrally molded cleats 14 which extend laterally across the belt. As shown in FIG. 1, the ends of the rollers shaft 15 are journalled within suitable bearings carried by the side walls 9, and one end of the roller shaft is connected through a chain drive 16 to the conveying end of jack shaft 16A that extends transversely across the end conveyor section 1, between the upper and lower runs of the belt. The opposite end of the jackshaft 16A is connected through belt drive 17 to the drive shaft of motor 18. Through operation of the motor 18, the belt will be driven in an endless path.

As best illustrated in FIG. 3, a pan 19 is mounted between the side walls 9 and supports, and seals the belt 13 in the area beneath the hopper 11, so that the feed being introduced to the hopper will not deflect the belt or leak around the edges of the upper run of the belt.

The top wall 7 of the end section 1 is provided with a series of vent slots 20, and as the upper run of the belt 13 moves toward the hopper, the belt will tend to pump air into the end section 1 and the air will be discharged through the vent slots 20 to prevent the air from agitating the feed in the hopper.

The end section 2 is constructed in a manner similar to that of end section 1 except that it does not have a hopper nor the support pan. Thus, the construction of the end section 2 will not be described in detail. A drive roller 21 is journalled within suitable bearings in the side walls 22 of end section 2, and the belt 13 is trained over the drive roller 21. One end of the drive roll shaft 23 projects outwardly from the end conveyor section 2 and is connected through a chain drive 24 to jackshaft 24A whch in turn connects through belt drive 25 to the drive shaft of motor 26. Motors 18 and 26 act to drive the belt at the same speed, and by driving both rollers 12 and 21, the area of frictional contact between the drive rollers and the belt is increased to thereby correspondingly increase the load capacity of the conveyor.

In some installations the bottom surface 27 of the end conveyor section 2 can be provided with a discharge opening 28 which communicates with a drop chute 29. The construction of the drop chute will be described more fully hereinafter.

The central conveyor sections 3 are generally U-shaped in cross section and comprise a bottom wall 30 and a pair of side walls 31 which terminate in outwardly extending flanges 32.

As a feature of the invention, the central conveyor sections are tapered throughout their length so that adjacent ends of the conveyor sections are telescoped together in lapping relation. The telescoped ends of the conveyor sections 3, as shown in FIG. 3, are connected together by bolts 33 which are disposed within spacer tubes 34 that extend between the side walls of the central conveying sections. In addition to maintaining proper spacing of the side walls, the spacer tubes 34 provide a secondary function in that they support the upper run of the conveyor belt 13 and prevent the upper run from sagging downwardly into contact with the lower run. Similar bolts 33 and tubes 34 can be connected across each conveyor section 3 at spaced intervals to support the belt.

As shown in FIG. 3, the belt 13 travels in the direction of the arrow and the feed being introduced through the hopper 11 is pulled down and is conveyed along the bottom wall 8 of the end conveyor section 1 and along the bottom wall 30 of the central sections 3 by the cleats 14. The central sections are provided with a plurality of discharge openings 35 which communicate with drop chute 29.

As best illustrated in FIG. 1, the lower end of each drop chute 29 is connected to a Y-gate 36 having a pair of discharge legs 37. A suitable valve or deflector plate is located in the Y-gate and serves to direct the feed into one or both of the legs 37. The lower end of each leg is located above a feed bin. In operation, the drop chute 29 and feed bin closest to the feed hopper is initially filled with feed by the cleated belt, and after that drop chute is filled, the feed is carried on by the belt to the next drop chute.

In order to provide selective discharge of the feed through the openings 35, a sliding closure plate 38 is associated with each of the openings. Each closure plate 38 is provided with an opening 39 which corresponds generally in size to the opening 35, and when the openings are in alignment the feed can be discharged to the drop chute 29, as shown in FIG. 4. By sliding the closure plate 38 to the closed position, the opening 35 will be closed, so that no feed will then be delivered into the drop chute.

To mount the closure plate 38 for sliding movement, channels 40 are secured to the side walls 9 of the conveyor section 3 and spacer bars 41 are secured between the lower flange 42 of each channel and the upper flange 43 of the drop chute, as illustrated in FIG. 4.

With this arrangement, the upper flange 43 of the drop chute 29 will be spaced below the bottom wall 8 of the conveyor section 3 and the closure plate 38 is adapted to slide within this space. Angles 44 which have the same length as the closure plate 38 are connected to the respective ends of the closure plate by bolts 45 and spacers 46. The bolts serve to connect the angles 44 to the closure plate 38 and function as stops to limit the movement of the closure plate in both directions. The ends of the closure plate 38 are provided with downwardly bent flanges 47 which serve as handles to move the closure plate between the open and closed positions.

The cleats 14 of the belt 13 will tend to sag down into the aligned openings 35 and 39, as shown in FIG. 3, and to guide the cleats upwardly as they approach the end of the aligned openings, the bottom wall 8 is formed with a downwardly extending lip or guide 48 which prevents the cleats 14 from catching or wearing against the edge of the opening.

Suitable cover plates 49, shown in FIG. 1, can be mounted over the open top of the conveyor sections 3, if desired, and serve to prevent snow, rain, and other contaminants from entering the conveyor if the unit is installed outside. If installed indoors, the cover plate can prevent contaminants or foreign materials from entering the conveyor.

With the conveyor of the invention, the feed is conveyed along the bottom wall 8 of the conveyor sections 3 and is selectively discharged into the drop chutes 29 for delivery to the feed bins. The drop chutes can be selectively closed off by operation of the closure plates 38 to thereby control the delivery of feed to the feed bins.

As the feed is conveyed along the bottom wall of the conveyor sections between the cleats 14 there is little agitation of the feed material, which minimizes separation of the components of the feed mix. Total clean-out of the conveyor sections or trough is possible because the feed is pulled along the bottom wall by the belt cleats.

The tapered conveyor sections facilitate assembly of the conveyor and eliminate the use of splice plates which are commonly employed in conveyor systems. Furthermore, the length of the conveyor can be readily varied by adjusting the amount of telescope between sections. Thus, it is not necessary to cut the conveyor sections to accommodate a given conveyor length.

The belt conveyor of the invention provides a very quiet operation and requires less energy and is safer than conventional grain conveying equipment.

Various modes of carrying out the invention are contemplated as being within the scope of the following claims particularly pointing out and distinctly claiming the subject matter which is regarded as the invention.

I claim:

1. A conveyor system, comprising a pair of end sections, at least one intermediate section extending between said end sections, said intermediate section including a bottom wall and a pair of side walls, a roll extending transversely of each of said end sections, an endless conveyor belt carried by said rolls and extending within said intermediate section, drive means for driving at least one of said rolls to move the belt in an endless path of travel, a plurality of cleats connected to said belt and extending laterally of said belt, said cleats disposed to convey a material along the bottom wall of said intermediate section, outlet means disposed in the bottom wall of said intermediate section whereby said material being conveyed by said cleats is discharged through said outlet means feed means connected to a first of said end sections for feeding said material to the belt, said first end section having a top wall adjacent said feed means and overlying the upper run of said belt, and vent means disposed in said top wall for venting air being pumped into said first end section by said belt, to thereby prevent air from agitating the material in said feed means.

2. The system of claim 1, and including a feed hopper connected to a first of said end sections for feeding said material to said conveyor belt, and a supporting pan disposed beneath the upper run of the belt and aligned with said hopper to prevent deflection of said upper run by said material being delivered through said hopper and prevent leakage of said material past the side edges of the belt.

3. A conveyor system, comprising a pair of end sections, a plurality of intermediate sections connected in end-to-end relation and extending between said end sections, each of said intermediate sections including a bottom wall and a pair of side walls, a roll extending transverse of each of said end sections, an endless belt conveyor carried by said rolls and extending within said intermediate sections, drive means for driving at least one of said rolls to move the belt in an endless path of travel, a plurality of cleats connected to said belt and extending laterally of said belt, said cleats disposed to convey a material along the bottom walls of said intermediate sections, outlet means disposed in the bottom wall of at least one of said intermediate sections whereby said material being conveyed by said cleats is discharged through said outlet means, said intermediate sections being generally U-shaped in cross section and having an open top, said intermediate sections tapering throughout their length and having a large end and a small end, the small end of one intermediate section being telescoped within the large end of the adjacent intermediate section, and connecting means for connecting the telescoped ends of the intermediate sections together, said connecting means including a connecting member extending between the side walls of the telescoped intermediate sections, the upper run of said endless belt riding against said connecting member.

4. A conveyor system, comprising a pair of end sections, a plurality of intermediate sections connected in end-to-end relation and extending between said end sections, each of said intermediate sections being generally U-shaped in cross section and including a bottom wall and a pair of side walls, adjacent ends of said intermediate sections being disposed in overlapping relation, a support roll extending transversely of each of said end sections, an endless belt conveyor carried by said rolls and extending within said intermediate sections, said belt being disposed to travel in a lower conveying run and an upper return run, drive means for driving at least one of the rolls to move the belt in said travel, a plurality of cleats connected to the belt and extending laterally of said belt, said cleats disposed to convey a material along the bottom walls of said intermediate sections as said belt travels in said lower conveying run, outlet means disposed in the bottom wall of at least one of said intermediate sections whereby said material being conveyed by said cleats in said lower conveying run is discharged through said outlet means, and a plurality of connecting members spaced along the length of the conveyor system and connecting the overlapping portions of adjacent intermediate sections, said connecting members extending laterally across the intermediate sections between the side walls of said sections and spaced between the bottom wall and the top edges of said side walls, the upper return run of said belt being supported on said connecting members.

5. The conveyor system of claim 4, wherein said connecting members are rotatably mounted with respect to said intermediate sections.

* * * * *